(12) United States Patent
Broussard et al.

(10) Patent No.: US 11,341,069 B2
(45) Date of Patent: May 24, 2022

(54) DISTRIBUTED INTERRUPT PRIORITY AND RESOLUTION OF RACE CONDITIONS

(71) Applicant: Advanced Micro Devices, Inc., Santa Clara, CA (US)

(72) Inventors: Bryan P Broussard, Austin, TX (US); Paul Moyer, Fort Collins, CO (US); Eric Christopher Morton, Austin, TX (US); Pravesh Gupta, Bengaluru (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/068,660

(22) Filed: Oct. 12, 2020

(65) Prior Publication Data

US 2022/0114123 A1 Apr. 14, 2022

(51) Int. Cl.
*G06F 13/26* (2006.01)
*G06F 12/0875* (2016.01)
*G06F 13/40* (2006.01)

(52) U.S. Cl.
CPC .......... *G06F 13/26* (2013.01); *G06F 12/0875* (2013.01); *G06F 13/4027* (2013.01); *G06F 2212/1008* (2013.01)

(58) Field of Classification Search
None
See application file for complete search history.

(56) References Cited

U.S. PATENT DOCUMENTS

| 5,495,615 A * | 2/1996 | Nizar ..................... G06F 13/26 710/123 |
| 10,275,352 B1 * | 4/2019 | Balakrishnan ........ G06F 12/084 |
| 10,360,168 B1 * | 7/2019 | Griffin ................. G06F 12/0808 |
| 2019/0196574 A1 * | 6/2019 | Tsien ................... G06F 12/0833 |
| 2019/0205244 A1 * | 7/2019 | Smith .................... G06F 12/12 |
| 2020/0065275 A1 | 2/2020 | Kalyanasundharam et al. |

* cited by examiner

*Primary Examiner* — Michael Sun
(74) *Attorney, Agent, or Firm* — Liang & Cheng, PC

(57) ABSTRACT

A method of operating a processing unit includes storing a first copy of a first interrupt control value in a cache device of the processing unit, receiving from an interrupt controller a first interrupt message transmitted via an interconnect fabric, where the first interrupt message includes a second copy of the first interrupt control value, and if the first copy matches the second copy, servicing an interrupt specified in the first interrupt message.

20 Claims, 8 Drawing Sheets

DISTRIBUTED INTERRUPT PRIORITY AND RESOLUTION OF RACE CONDITIONS

BACKGROUND

An interrupt is an event that changes instruction execution from a currently executing instruction flow to another instruction flow, and is typically generated by a processor or a device coupled to the processor. A typical interrupt processing mechanism changes program control flow of the interrupted processor to an interrupt handler. Input/output (I/O) device and central processing unit (CPU) to CPU interrupts are generally delivered to a CPU thread in a computing system depending on the programming of an interrupt controller device or the type of interrupt being delivered.

Interrupt requests originating from multiple devices are managed by an interrupt controller according to interrupt priorities and interrupt masks recorded in the system. Interrupt priority levels and interrupt masks indicate which interrupts are allowed to interrupt a task currently being executed by a CPU. The interrupt mask includes a set of bits indicating which interrupts are ignored by the CPU. In addition, an interrupt is ignored if its priority level does not exceed the priority of the task it would interrupt.

BRIEF DESCRIPTION OF THE DRAWINGS

The present disclosure is illustrated by way of example, and not by way of limitation, in the figures of the accompanying drawings.

DETAILED DESCRIPTION

Figure 1:
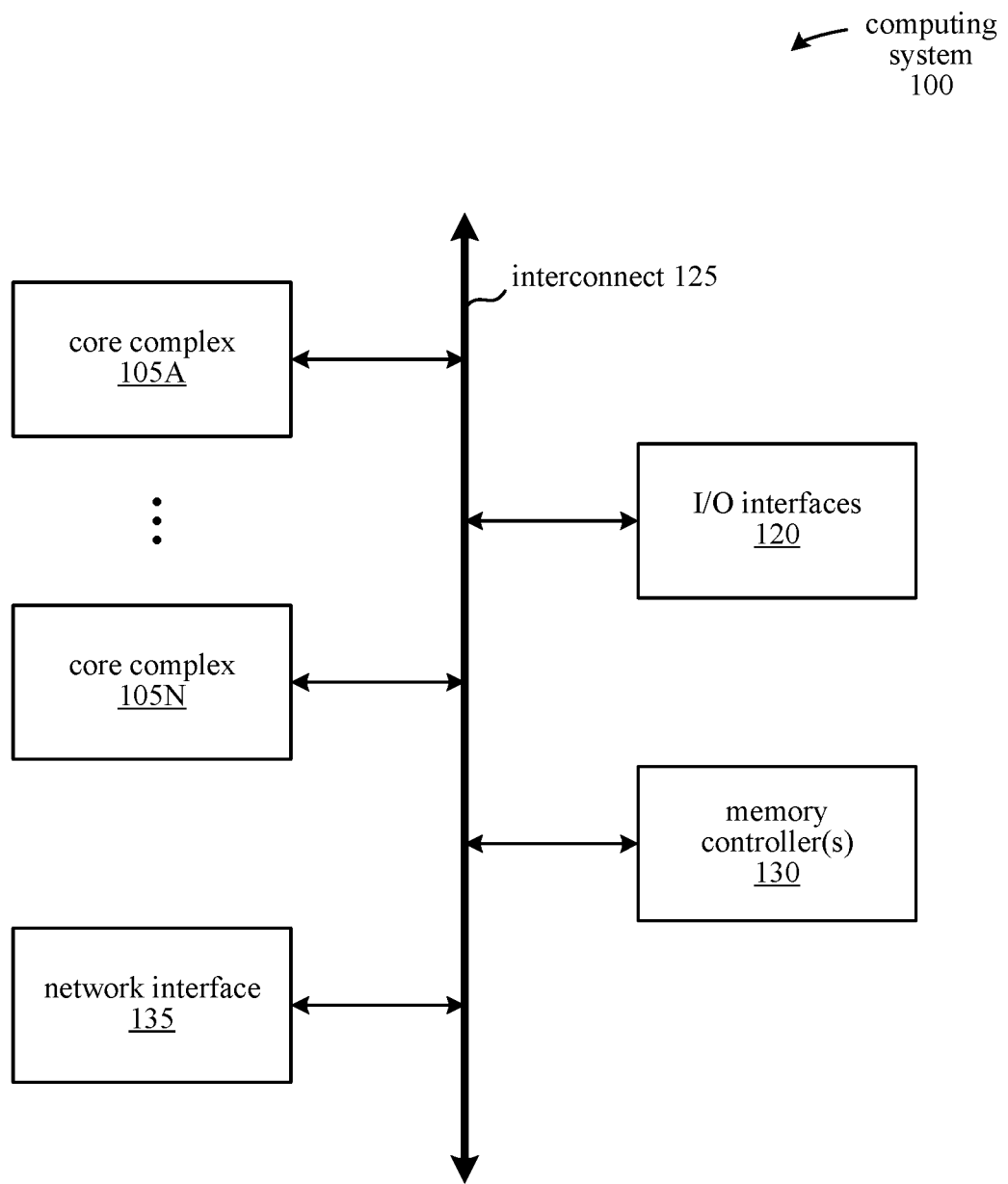
FIG. 1 illustrates a computing system, according to an embodiment.

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

One embodiment of a computing system includes multiple processing units that communicate with memory and other devices via a data interconnect fabric. The data interconnect fabric connects multiple nodes in an arbitrary topology, and conveys messages between the nodes. Messages are used for various purposes, including maintaining memory coherence and transmitting interrupts generated by peripheral devices. Interrupt messages are generated by interrupt controllers connected in the data interconnect fabric and are transmitted over the interconnect fabric to one or more processing units in the system. However, message-based delivery of interrupts over the interconnect fabric can result in race conditions due to the communication latency for messages sent between the interrupt controller and the processing units.

Race conditions can occur when interrupt control values are changed using update messages transmitted over the interconnect fabric, and then an interrupt message is issued by the interrupt controller before the update reaches the interrupt controller. The interrupt controller includes a set of interrupt control registers, which are used to store interrupt control values that affect how interrupts are raised and handled. One register is the task priority register, which stores a task priority value for a task currently being executed in a processing unit. The task priority determines which interrupts are allowed to interrupt the currently executing task; interrupts having a lower priority than the task priority are not allowed to interrupt the task. The task priority in the interrupt controller is changed by the processing unit depending on the task being executed. Accordingly, the task priority can change frequently or unpredictably depending on the processing unit's workload.

The task priority is updated by the processing unit sending a write message directed to the task priority register in the interrupt controller. Since the update message is transmitted over the interconnect fabric, the change to the task priority is delayed by the communication latency. A race condition occurs when an interrupt message is sent from the interrupt controller after the processing unit sends the update message, but before the update is reflected in the task priority register. In this case, the processing unit can receive an interrupt having a lower priority than its current task priority value.

A race condition can also affect the function other interrupt control values, such as interrupt enable values, which is stored in an interrupt enable register in the interrupt controller. For example, if the processing unit updates an interrupt enable value, the update is delayed by the communication latency between the processing unit and the interrupt controller. The race condition occurs if, after the processing unit sends the update message and before the update is reflected in the interrupt enable register, the interrupt controller sends an interrupt message for an interrupt that would have been disabled by the new interrupt enable value. The processing unit then receives an interrupt message for an interrupt that was disabled.

In one embodiment, race conditions for interrupt control values that change frequently (e.g., task priorities) are resolved by maintaining a first shadow copy of the interrupt control value near the processing unit (i.e., accessible with low latency) and comparing it with a second copy of the interrupt control value received in the interrupt message, with the second copy representing the interrupt control value at the interrupt controller at the time the interrupt was generated. If the values match, then the interrupt is serviced according to an interrupt vector delivered with the initial interrupt message. If the values do not match, an interrupt vector for the indicated interrupt is requested from the interrupt controller. If the interrupt is still allowed after the updated interrupt control value has been received at the interrupt controller, then the interrupt controller responds, and the interrupt is serviced.

Race conditions for interrupt control values that change infrequently (e.g., interrupt enable values) are resolved by setting a danger flag near the processor, which can be set and read with low latency, when an update to the interrupt control value is detected. For an interrupt message that is received while the danger flag is asserted, the processing unit requests an interrupt vector from the interrupt controller and deasserts the danger flag. Thus, any update to the interrupt control value is reflected in the interrupt controller's response.

FIG. 1 illustrates a block diagram of one embodiment of a computing system 100, in which the above race condition detection and resolution approach is implemented. Computing system 100 includes at least core complexes 105A-N, input/output (I/O) interfaces 120, interconnect fabric 125, memory controller(s) 130, and network interface 135. In other embodiments, computing system 100 includes other components and/or computing system 100 is arranged differently. Each core complex 105A-N includes one or more general purpose processors, such as central processing units (CPUs). It is noted that a "core complex" is also referred to as a "processing node", "processing unit" or a "CPU" herein. In some embodiments, one or more core complexes 105A-N include a data parallel processor with a highly parallel architecture. Examples of data parallel processors include graphics processing units (GPUs), digital signal processors (DSPs), and so forth.

Memory controller(s) 130 are representative of any number and type of memory controllers accessible by core complexes 105A-N. Memory controller(s) 130 are coupled to any number and type of memory devices (not shown). For example, the type of memory in memory device(s) coupled to memory controller(s) 130 can include Dynamic Random Access Memory (DRAM), Static Random Access Memory (SRAM), NAND Flash memory, NOR flash memory, Ferroelectric Random Access Memory (FeRAM), or others. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In general, the computing system 100 is embodied as any of a number of different types of devices, including but not limited to a laptop or desktop computer, mobile device, server, etc. Some embodiments of computing system 100 may include fewer or more components than the embodiment as illustrated in FIG. 1. Additionally, in other embodiments, computing system 100 is structured in other ways than shown in FIG. 1.

Figure 2:
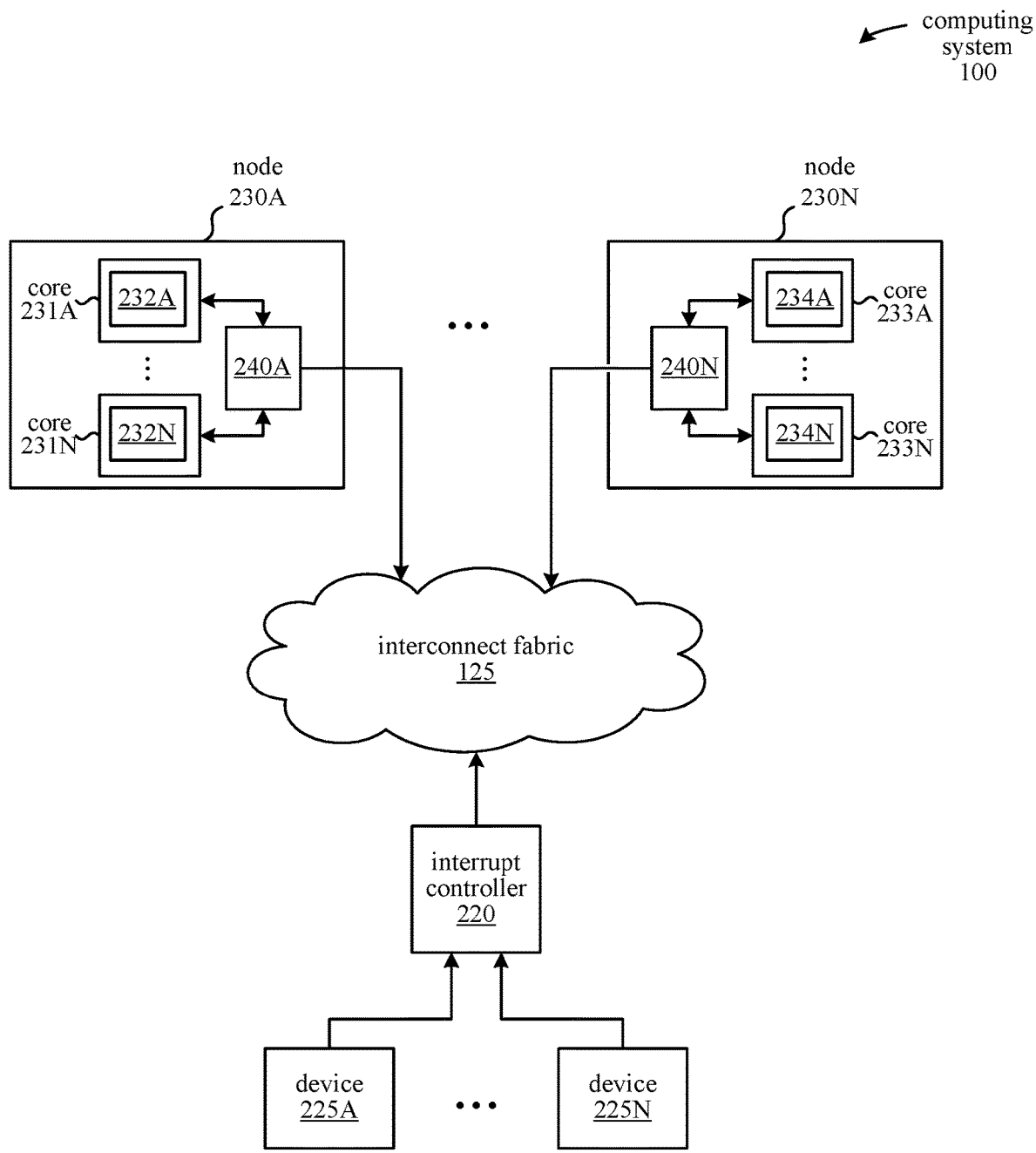
FIG. 2 illustrates components in a computing system, according to an embodiment.

FIG. 2 is a block diagram illustrating specific components in the computing system 100, according to an embodiment. In one embodiment, the computing system 100 is a system on chip (SoC). In other embodiments, the computing system 100 is any of various other types of computing systems.

As illustrated in FIG. 2, the computing system 100 is implemented with a number of processing nodes 230A-N that are connected by an interconnect fabric 125. The interconnect fabric represents a network of communication links, and also includes devices such as memory nodes, devices for facilitating communication between nodes, and so forth. Devices 225A-N represent any number and type of peripheral or input/output (I/O) devices connected to the interconnect fabric 125 via the interrupt controller 220. Nodes 230A-N represent of any number and type of processing nodes connected to the interconnect fabric 125. The number of nodes included in system 100 varies in different embodiments. Each node 230A-N includes a number of processor cores, such as 231A-N in node 230A, and 233A-N in node 230N.

The computing system 100 enforces a memory coherency protocol to ensure that a processor core or device does not concurrently access data that is being modified by another core or device. The cores and devices in system 200 transmit coherency messages (e.g., coherency probe messages and probe responses) over the interconnect fabric 125. A coherency probe message is a message that seeks the coherency state of data associated with a particular memory location. A probe response is typically sent back to the coherent agent that generated the coherency probe message, and indicates the coherency state of the referenced data, transfers data in response to a probe, or provides other information in response to a probe.

In addition to coherency probe messages, the interconnect fabric is used to transmit interrupt messages originated by the devices 225A-225N and targeting one or more of the processing nodes 230A-230N. In various embodiments, each of the devices 225A-N is able to generate an interrupt by asserting an interrupt signal which is detected by the interrupt controller 220. In response to detecting the interrupt signal, interrupt controller 220 generates an interrupt message with information such as destination identifier, delivery mode, interrupt vector, or other suitable information. The interrupt message is encoded for transmission over the interconnect fabric, and is transmitted over the interconnect fabric 125 to one or more nodes 230A-N that are targeted by the interrupt. In one embodiment, the interrupt message is broadcast on the interconnect fabric 125 to all of the nodes 230A-N. Alternatively, the interrupt message is sent to only the node or nodes targeted by the interrupt message.

Interconnect fabric 125 is connected to a cache subsystem 240A-N in each node 230A-N, respectively. Each cache subsystem 240A-N includes a level three (L3) cache and a level two (L2) cache. In addition, each core includes a local level one (L1) cache. In alternative embodiments, the cache subsystems include other cache levels. When one of the cache subsystems 240A-N receives an interrupt message via interconnect fabric 125, the given cache subsystem sends the interrupt message to the interrupt controller(s) within the corresponding core(s). As illustrated, nodes 230A-N include interrupt controllers 232A-N and 234A-N within cores 231A-N and 233A-N, respectively. In one embodiment, in response to receiving an interrupt message, a given cache subsystem 240A-N broadcasts the interrupt message to all of the cores in the corresponding node. In an alternative embodiment, in response to receiving an interrupt message, a given cache subsystem 240A-N sends the interrupt message only to those cores targeted by the interrupt message. The interrupt controller(s) in the core(s) examine the interrupt message and generate interrupts to send to the targeted core(s).

Figure 3:
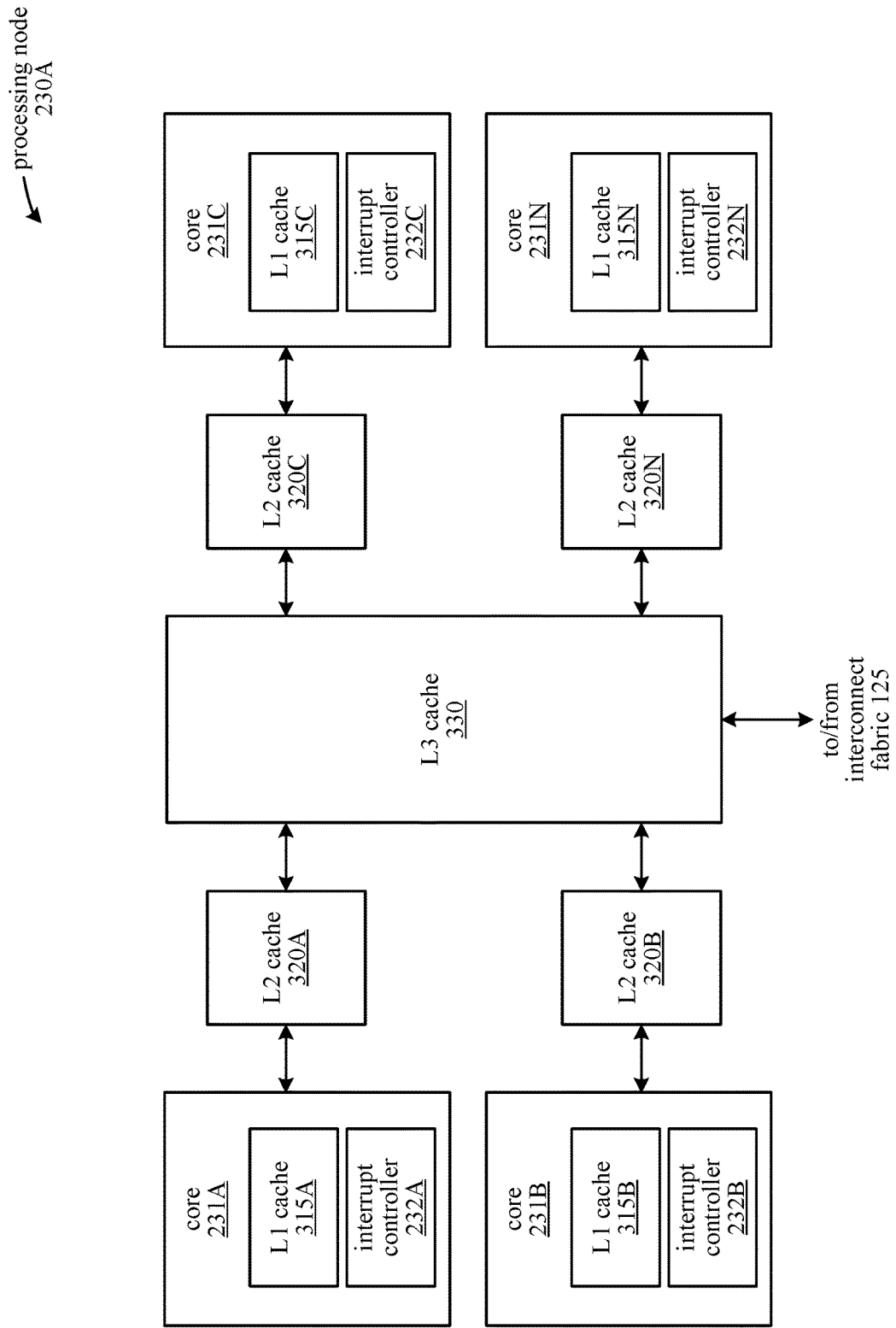
FIG. 3 illustrates a processing node in a computing system, according to an embodiment.

FIG. 3 is a block diagram illustrating an embodiment of a processing node 230A. In one embodiment, processing node 230A includes four processor cores 231A-N. In other embodiments, processing node 230A includes fewer or more processor cores. It is noted that a "processing node" can also be referred to as a "core complex", "node", or "CPU" herein.

In one embodiment, the components of core complex 230A are included within core complexes 105A-N, as illustrated in FIG. 1.

Each processor core 231A-N includes a cache subsystem for storing data and instructions retrieved from the memory subsystem (not shown). Each core 231A-N includes a corresponding level one (L1) cache 315A-N. Each processor core 231A-N also includes or is coupled to a corresponding level two (L2) cache 320A-N. Additionally, processing node 230A includes a level three (L3) cache 330 which is shared by the processor cores 231A-N. In alternative embodiments, processing node 230A can include other types of cache subsystems with fewer or more caches and/or with other configurations of the different cache levels.

L3 cache 330 is coupled to an interconnect fabric 125. L3 cache 330 receives interrupt messages via interconnect fabric 125 and forwards interrupt messages to L2 caches 320A-N. In one embodiment, L3 cache 330 broadcasts received interrupt messages to all L2 caches 320A-N. In an alternative embodiment, L3 cache 330 forwards a received interrupt message to only those L2 caches 320A-N targeted by the interrupt message. The L2 caches 320A-N forward interrupt messages for processing to interrupt controllers 232A-N, respectively.

Figure 4:
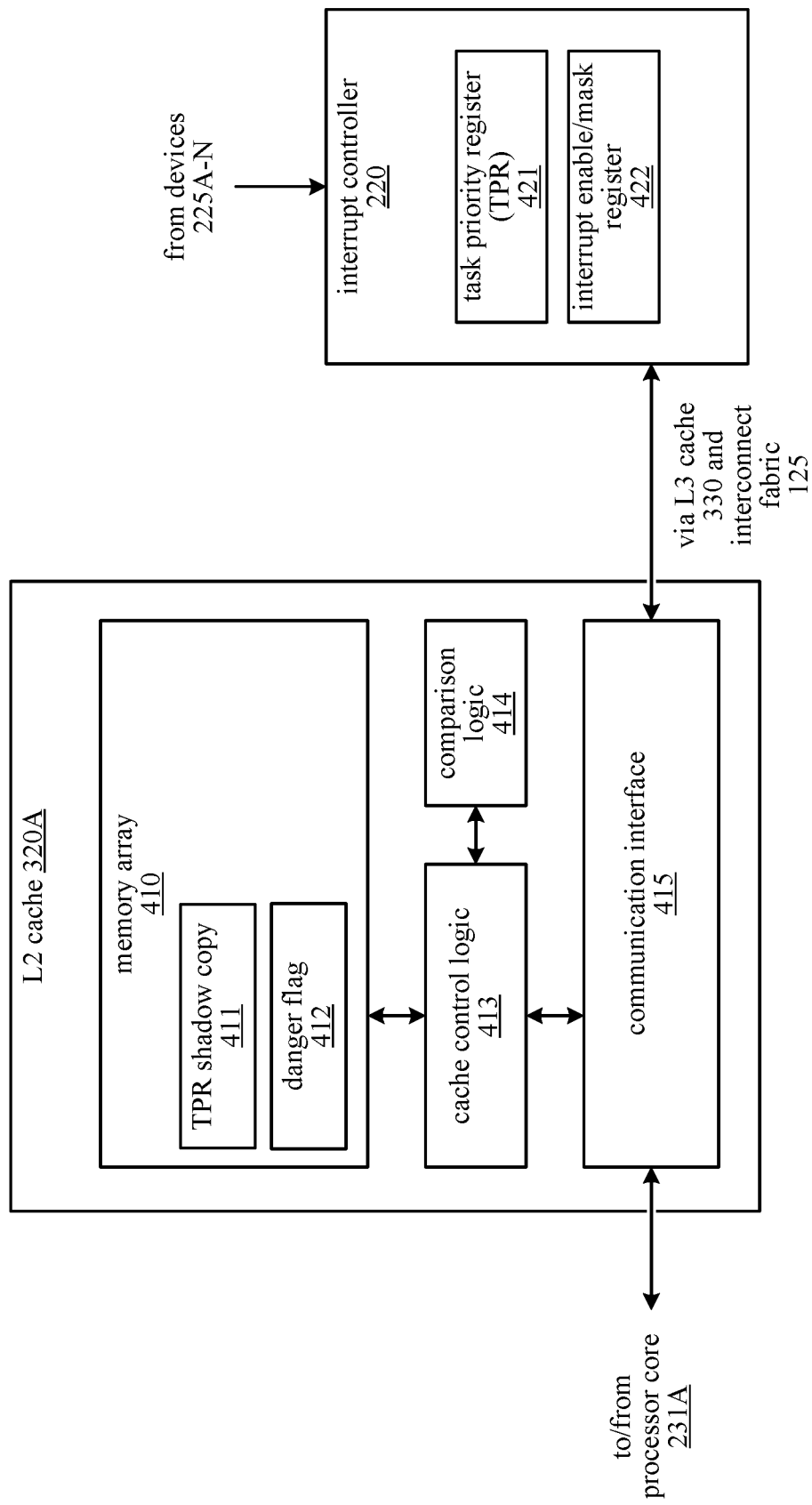
FIG. 4 illustrates components in a level 2 (L2) cache and an interrupt controller, according to an embodiment.

FIG. 4 illustrates components in an L2 cache and an interrupt controller implementing race condition resolution mechanisms for interrupt messages transmitted over the interconnect fabric, according to an embodiment.

The interrupt controller 220 is connected to one or more peripheral devices 225A-N, and transmits an interrupt message when an interrupt event occurs in one or more of the peripheral devices 225A-N. Interrupt messages are generated by the interrupt controller 220 based on one or more interrupt control values, which are stored in interrupt control registers in the interrupt controller 220. The interrupt control registers include a task priority register 421 and an interrupt enable register 422.

The interrupt enable register 422 stores an interrupt enable value that indicates whether each of multiple interrupts associated with the devices 225A-N is enabled. In one embodiment, the interrupt enable value includes a bit for each interrupt that is asserted high (or low, when implemented as an interrupt mask) if the corresponding interrupt is enabled. The interrupt controller 220 generates interrupt messages for interrupts that are enabled, and does not generate interrupt messages for interrupts that are disabled.

The task priority register 421 stores a task priority value associated with a task being executed by the processor core 231A. In one embodiment, the task priority register 421 also stores additional task priority values for tasks being executed in other processor cores. Each interrupt event is associated with a priority level so that, when an interrupt event occurs, the interrupt controller 220 determines whether the event is allowed to interrupt the current task by comparing the priority level of the interrupt with the task priority in the task priority register 421. If the interrupt's priority level exceeds the task priority, then the interrupt controller 220 generates an interrupt message for transmitting over the interconnect fabric 125. The interrupt controller 220 does not send interrupt messages for interrupts having a lower priority than the current task. For interrupt events that are enabled and that have a higher priority than the current task, the interrupt controller 220 transmits an interrupt message over the interconnect fabric 125. The interrupt message is received at the L3 cache 330 and forwarded to the L2 cache 320A.

The L2 cache 320A implements two mechanisms for resolving race conditions that can arise when interrupt control values, such as the task priority and the interrupt enable value, are changed. A race condition can occur when an interrupt message is transmitted by the interrupt controller after the processor core 231A has sent an update of the interrupt control value to the interrupt controller 220, but before the update has reached the interrupt controller.

In one embodiment, a shadow copy comparison mechanism is performed to resolve race conditions affecting the task priority. The processor core 231A changes the task priority depending on the tasks being executed in the core 231A. The processor core 231A changes the task priority by transmitting an update (e.g., a new task priority value) to the interrupt controller 220 via the interconnect fabric 125. Upon receiving the update, the interrupt controller 220 changes the task priority value in the task priority register 421 to the new task priority value.

The control logic 413 maintains a shadow copy 411 of the task priority register 421 in the memory 410 of the L2 cache 320A. The control logic 413 responds to the transmission of the updated task priority value by storing the copy 411 of the new task priority. When the processor core 231A updates the task priority, the update indicating the new task priority value passes the communication interface 415 of the L2 cache 320A before reaching the interconnect fabric 125. At this stage, the cache control logic 413 determines that an update of the task priority is being sent by detecting that the update message is a write access message directed to the address of the task priority register 421. The control logic 413, having access to the updated task priority value, stores a copy 411 of the new task priority value in its memory array 410. The shadow copy 411 of the new task priority is thus stored in the L2 cache near the processor core (i.e., accessible with low latency) before the update is received by the interrupt controller 220 and is reflected in the task priority register 421.

For each interrupt message that is transmitted from the interrupt controller 220, the interrupt controller 220 includes the interrupt vector and the task priority value from the task priority register 421 at the time the interrupt message is generated. The interrupt message with the interrupt controller 220's task priority value is received at the communication interface 415. The control logic 413 obtains the first copy 411 of the task priority from the memory array 410 and the second copy from the interface 415. The two copies of the task priority are compared in the comparison logic 414.

If the first copy 411 matches the second copy of the task priority, the control logic 413 transmits the interrupt vector received with the interrupt message to the processor core 231A. The interrupt vector contains information about the interrupt, and identifies the ISR to be executed for servicing the interrupt. Depending on the state of the interrupt controller 232A, the processor core 231A services, delays, or ignores the interrupt. The processor core 231A services the interrupt by interrupting execution of its current task and starting execution of the ISR in response to receiving the interrupt vector. If the first copy 411 differs from the second copy, the comparison logic 414 signals the control logic 413 to initiate a request for an interrupt vector from the interrupt controller 220. The control logic 413 sends a message to the interrupt controller 220 requesting an interrupt vector for the interrupt message that was received. For clarity, the processor core 231A is described herein as servicing an interrupt whenever an interrupt vector is received for the interrupt, and requesting an interrupt vector from the interrupt controller 220 whenever a race condition or potential race condition is detected. However, in practice, the state of interrupt controller 232A can determine whether the interrupt service or interrupt vector request is delayed or ignored instead.

In some cases, the new task priority value is updated in the task priority register 421 before the request for the interrupt vector is received by the interrupt controller 220, and is higher than the interrupt priority, thus obviating the interrupt. The interrupt controller 220 then returns an indication that the interrupt does not need to be serviced. In other cases, the new task priority is not higher than the interrupt priority. Then, the interrupt controller 220 responds to the request by transmitting the interrupt vector in another message to the L2 cache via the interconnect fabric 125. In alternative embodiments, the above shadow copy comparison mechanism is used for detecting race conditions for interrupt control values other than the task priority. In particular, the mechanism is suited for values that change frequently.

In one embodiment, potential race conditions for one or more interrupt control values, such as an interrupt enable value, are detected by setting a danger flag when the value is changed. The processor core 231A changes the interrupt enable value by transmitting a new interrupt enable value in an update message to the interrupt controller 220, for writing in the interrupt enable register 422. The update is transmitted from the processor core 231A to the interconnect fabric 125 via the communication interface 415 of the L2 cache 320A.

The control logic 413 in the L2 cache 320A monitors a number of addresses (including the address of the interrupt enable register 422) that, if updated, can cause race conditions. In response to detecting that the update message is writing a new value to the interrupt enable register 422, the control logic 413 asserts a danger flag 412 in the memory 410 of the L2 cache 320A. In alternative embodiments, the danger flag 412 is located in memory other than the memory array 410, such as a register within the control logic 413, or memory outside the L2 cache 320A.

Subsequently, when an interrupt event occurs in one of the devices 225A-N, the interrupt controller 220 sends an interrupt message to the L2 cache 320A. The control logic 413 in the L2 cache 320A receives the interrupt message and responds by checking the danger flag 412. If the danger flag 412 is asserted, the control logic 413 sends a message to the interrupt controller 220 to request the interrupt vector associated with the received interrupt message, and deasserts the danger flag 412.

The updated interrupt enable value reaches the interrupt enable register 422 before the request for the interrupt vector is received by the interrupt controller 220. If the new interrupt enable value disabled the interrupt, the interrupt controller 220 responds with a message indicating that the interrupt does not need to be serviced. If the new interrupt enable value does not disable the interrupt, the interrupt controller 220 returns the interrupt vector, and the processor core 231A interrupts its current task to execute the ISR indicated in the vector.

Figure 5:
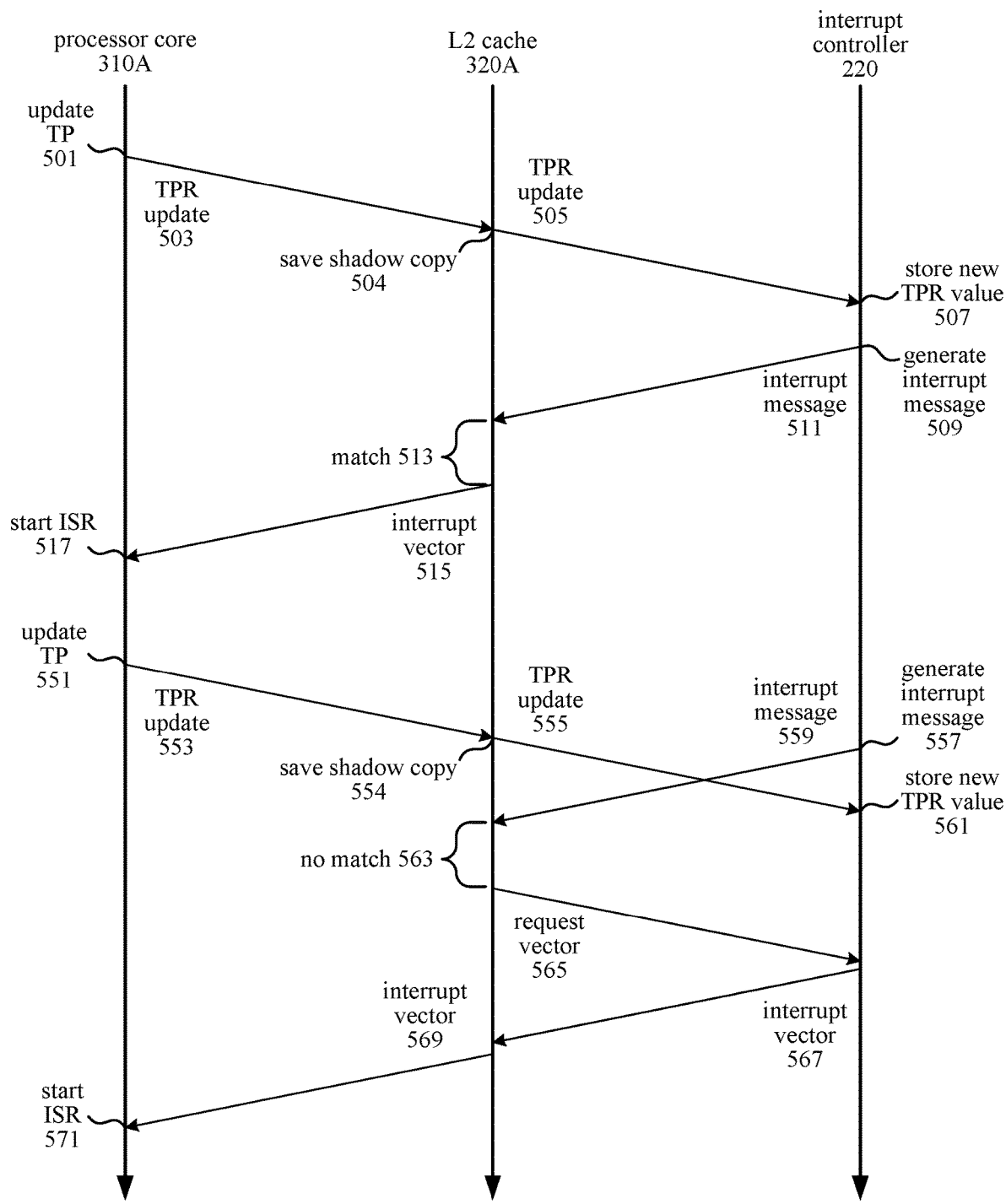
FIGS. 5 and 6 illustrate communications between components in a computing system implementing race detection mechanisms, according to an embodiment.

FIG. 5 is a network diagram illustrating communications between the processor core 231A, L2 cache 320A, and interrupt controller 220, according to an embodiment in which the shadow copy comparison mechanism is implemented for detecting and resolving race conditions. An update of the task priority does not result in a race condition when the updated task priority reaches the task priority register 421 in the interrupt controller 220 before an interrupt message is generated. The processor core 231A begins by initiating an update of the task priority 501. The processor core 231A sends an update message 503 to the L2 cache 320A. The L2 cache 320A identifies the update message as changing the task priority value, and thus saves a shadow copy 504 of the new task priority value. The L2 cache 320A then forwards the update message 505 over the interconnect fabric 125 to the interrupt controller 220. When the update message 505 reaches the interrupt controller 220, the interrupt controller 220 stores 507 the new task priority value in the task priority register 421.

Subsequently, the interrupt controller 220 generates an interrupt message 509 in response to an interrupt event occurring in one of the devices 225A-N. The interrupt controller 220 transmits the interrupt message 511 over the interconnect fabric 125 to the L2 cache 320A. When the interrupt message 511 is received at the L2 cache 320A, the copy of the task priority value received in the interrupt message is compared with the shadow copy 411 of the task priority that was previously saved 504. In this case, the values match when compared 513 because the updated task priority value was stored 507 in the task priority register 421 before the interrupt message was generated 509. Since the task priority values match 513, the interrupt vector 515 from the interrupt message 511 is transmitted to the processor core 231A. The processor core 231A starts the ISR 517 specified in the vector 515 upon receipt.

A race condition occurs when the processor core 231A issues an update of the task priority, and the interrupt controller 220 sends an interrupt message after the update is issued by the processor core 231A and before the update is received at the interrupt controller 220. The processor core 231A updates the task priority 551 by sending an updated task priority 533 to the L2 cache 320A, which saves 554 a shadow copy of the updated task priority value, and transmits the updated task priority 555 to the interrupt controller 220. Before the update 555 reaches the interrupt controller 220, the interrupt controller generates 557 and transmits an interrupt message 559 in response to an interrupt event. The interrupt message 559 includes a copy of the original task priority value obtained from the task priority register 421 at the time the interrupt message was generated 557.

After the interrupt message 559 is transmitted, the update message 555 arrives at the interrupt controller 220, and the new task priority value is stored 561 in the task priority register 421. When the interrupt message 559 arrives at the L2 cache 320A, the task priority value included in the message 559 is compared with the shadow copy 411 of the task priority. The values do not match 563 because the shadow copy 411 contains the updated task priority value while the interrupt message 559 contains the original task priority value. Because the values do not match 563, the L2 cache 320A transmits a request 565 for the interrupt vector to the interrupt controller 220 via the interconnect fabric 125. The request 565 arrives at the interrupt controller 220 after the task priority value has been updated 561 in the interrupt controller 220. The interrupt controller 220 receives the request 565 and returns the interrupt vector 567 associated with the interrupt message 559 if the interrupt is still valid (e.g., the interrupt priority is still higher than the new task priority). The L2 cache 320A forwards the interrupt vector 569 to the processor core 231A, and the processor core 231A interrupts its current task to start the ISR 571 indicated in the vector 569. In situations where the new task priority is higher than the interrupt priority, the interrupt controller 220 responds to the request 565 by transmitting an indication to the L2 cache 320A that the interrupt does not need to be serviced, instead of returning the interrupt vector 567.

Figure 6:
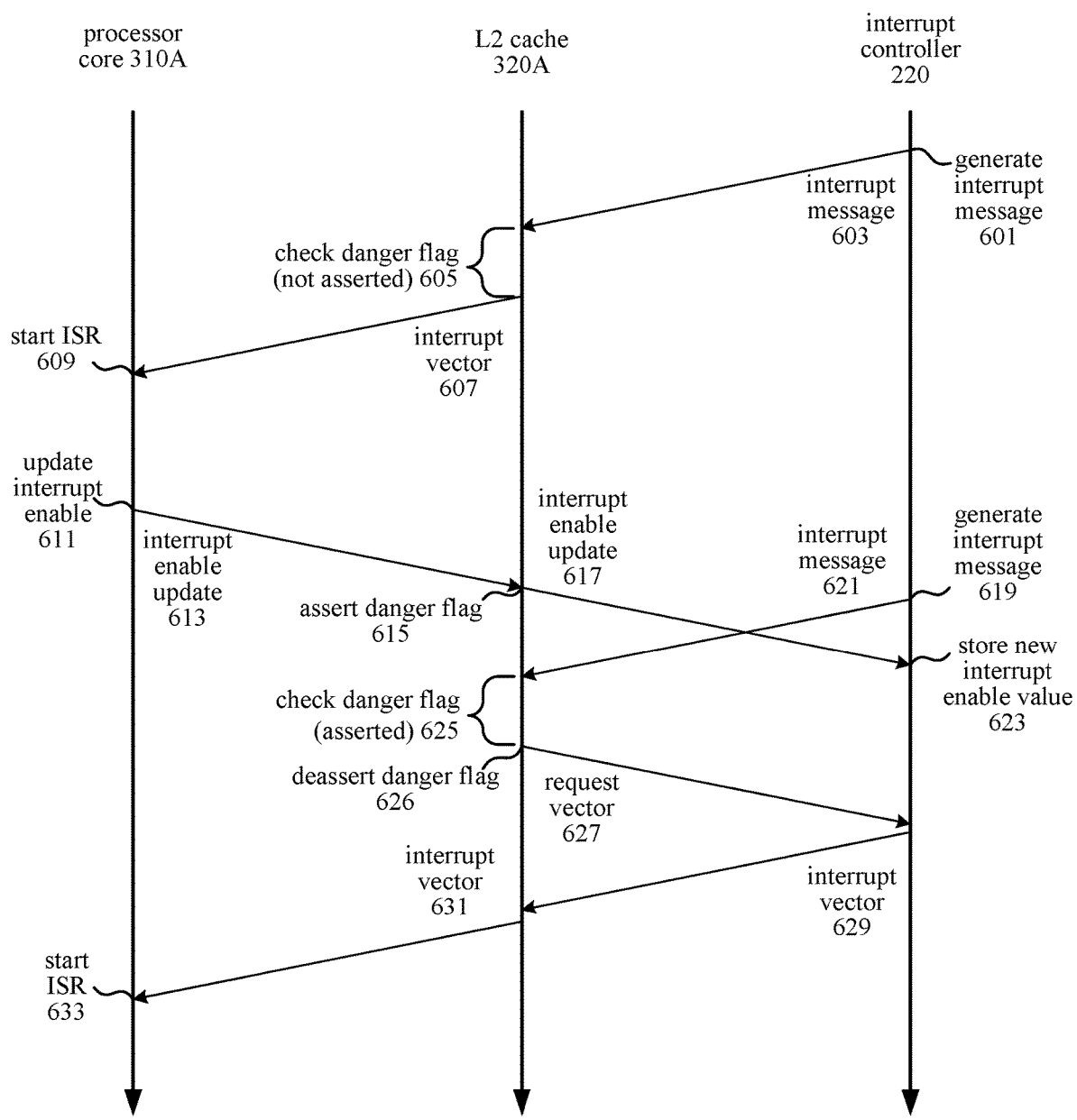

FIG. 6 is a network diagram illustrating communications between the processor core 231A, L2 cache 320A, and interrupt controller 220, according to an embodiment in which the danger flag mechanism is implemented for detecting and resolving potential race conditions caused by updating one or more interrupt control values, such as an interrupt enable value. In one embodiment, the shadow copy comparison mechanism is performed in conjunction with the danger flag mechanism; however, actions performed for implementing the shadow copy comparison mechanism are omitted from FIG. 6 for clarity.

When the interrupt enable value is not updated, the interrupt controller 220 generates an interrupt message 601 in response to an interrupt event, and transmits the interrupt message 603 over the interconnect fabric 125 to the L2 cache 320A. The control logic 413 determines that the danger flag is not asserted 605. Because the danger flag is not asserted 605, no potential race condition is detected and the L2 cache 320A sends the interrupt vector 607, obtained from the interrupt message 603, to the processor core 231A. The processor core 231A interrupts its current task and starts the ISR 609 specified in the vector 607 upon receiving the vector 607.

When the interrupt enable value is updated, a race condition could occur the next time an interrupt is raised. Therefore, the danger flag 412 is asserted when the update occurs so that the next interrupt is processed in a manner that avoids any potential race condition. The processor core 231A initiates an update 611 of the interrupt enable value by transmitting an updated interrupt enable value 613 to the L2 cache 320A. The L2 cache 320A monitors a set of addresses that, when written, can potentially cause a race condition. The monitored set of addresses includes the address of the interrupt enable register 422; thus, the L2 cache 320 asserts 615 the danger flag 412 in response to detecting that the update 613 is a write message directed to the interrupt enable register 422. The L2 cache 320A transmits the update message 617 to the interrupt controller 220. Before the interrupt controller 220 receives the update message 617, the interrupt controller 220 generates 619 and transmits 621 and interrupt message in response to an interrupt event. After the interrupt message 621 is sent, the update message 617 is received at the interrupt controller 220 and the new interrupt enable value is stored 623 in the interrupt enable register 422.

When the interrupt message 621 reaches the L2 cache 320A, the control logic 413 checks 625 the danger flag 412. Since the danger flag is asserted, the L2 cache 320A requests the interrupt vector 627 from the interrupt controller 220 and also deasserts the danger flag 626. The request 627 arrives at the interrupt controller 220 after the interrupt enable value has been updated 623 in the interrupt controller 220. The interrupt controller 220 receives the request 627 and sends a message 629 with the interrupt vector for the interrupt message 621 via the interconnect fabric 125 if the interrupt is still valid (e.g., was not disabled by the new interrupt enable value). The L2 cache 320A receives the message 629 and forwards 631 the interrupt vector to the processor core 231A. The processor core 231A interrupts its current task to start the ISR 633 upon receiving the interrupt vector 631. In situations where the new interrupt enable value 623 disables the interrupt 621 that was sent, the interrupt controller 220 responds to the request 627 by transmitting an indication to the L2 cache 320A that the interrupt does not need to be serviced, instead of returning the interrupt vector 629.

Figure 7:
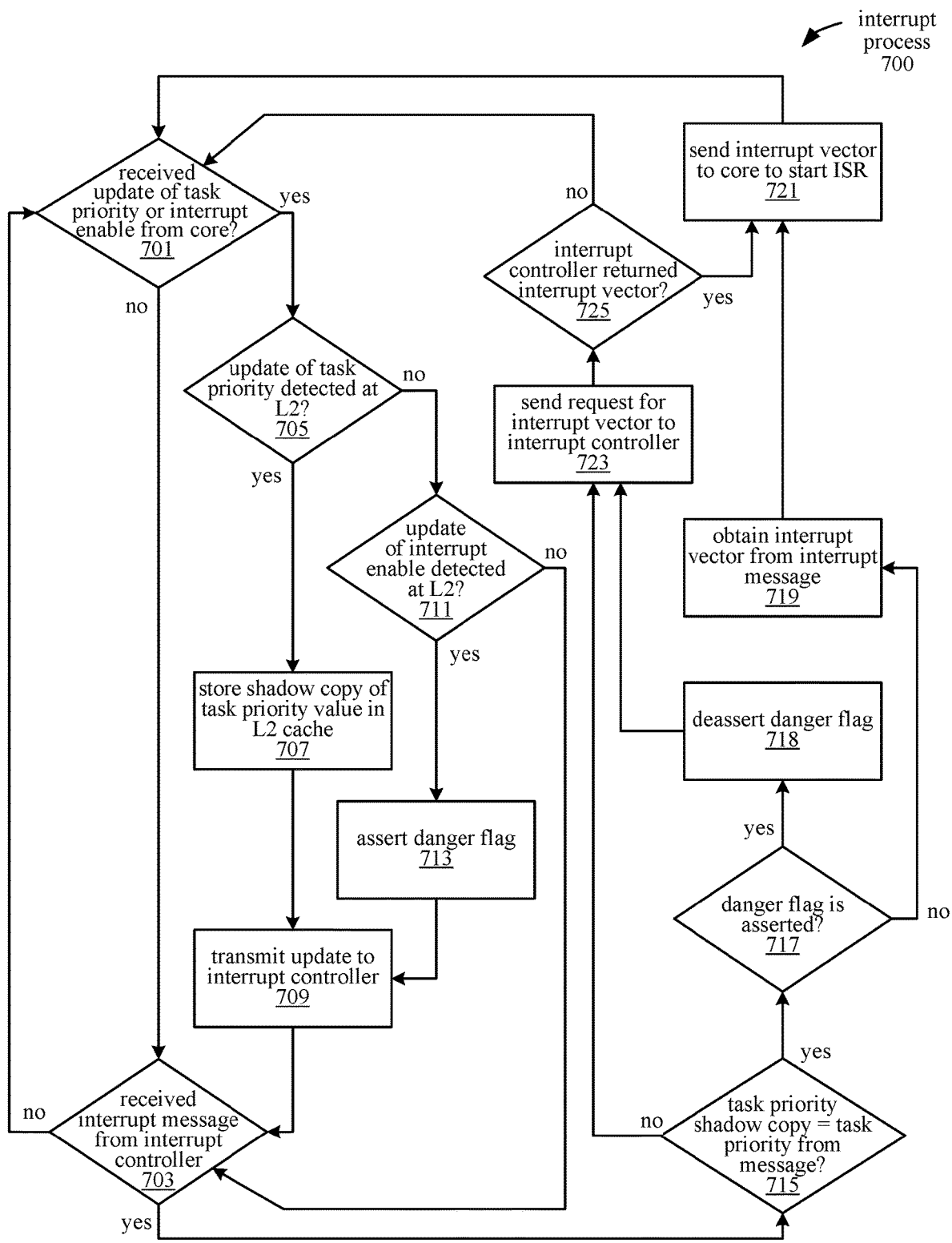
FIGS. 7 and 8 illustrate processes for detecting and resolving race conditions for interrupts, according to an embodiment.

FIG. 7 is a flow diagram illustrating a process 700 of processing interrupts, according to an embodiment. The process 700 is performed in components of a computing system 100, such as the processor core 231A and L2 cache 320A.

The L2 cache 320A implements the race condition detection mechanism by performing actions in response to updates of interrupt control values (e.g., the task priority and/or interrupt enable value), and in response to receiving interrupt messages from an interrupt controller 220. At block 701, if no update of the task priority or interrupt enable value has been received, the process 700 continues at block 703. At block 703, if no interrupt message has been received, the process 700 returns to block 701. The L2 cache 320A thus repeats blocks 701 and 703 to monitor for interrupt control value updates and interrupt messages.

The processor core 231A updates interrupt control values, such as the task priority and the interrupt enable value, by transmitting update messages to the interrupt controller where the primary copies of the interrupt control values are maintained (e.g., in registers 421 and 422). The update messages are transmitted via the L2 cache 320A, and then via the L3 cache 330 and interconnect fabric 125 to the interrupt controller 220. At block 701, if the L2 cache 320A receives an update message for updating the task priority or interrupt enable value, the process 700 continues at block 705. At block 705, if the control logic 413 in the L2 cache 320A detects that the update message is a write access to the address of the task priority register 421, then at block 707, the control logic 413 obtains the new task priority value from the update message and stores a shadow copy 411 of the new task priority value in the memory array 410 of the cache 320A. At block 709, the update message is transmitted from the communication interface 415 to the interrupt controller 220 via the L3 cache 330 and interconnect fabric 125. The storing of the shadow copy 411 of the task priority value in the L2 cache 320A is thus completed prior to the receiving of the update message at the interrupt controller 220, which occurs after some delay due to communication latency over the interconnect fabric 125. The interrupt controller 220 updates the task priority value in its register 421 when the interrupt controller 220 receives the update message containing the new task priority.

At block 705, if the update message is not a write request directed to the task priority register 421, then the process 700 continues at block 711. At block 711, if the update is not directed to the interrupt enable register 422, the process 700 returns to block 703 to continue monitoring for interrupt messages and interrupt control value updates. However, if the update is directed to the interrupt enable register 422, the control logic 413 asserts the danger flag 412 as provided at block 713. At block 709, the update message is transmitted from the communication interface 415 to the interrupt controller 220 via the L3 cache 330 and interconnect fabric 125. The danger flag 412 is thus asserted prior to the receiving of the update message at the interrupt controller 220. The interrupt controller 220 updates the interrupt enable value in its register 422 when the interrupt controller 220 receives the update message containing the new interrupt enable value. From block 709, the process 700 returns to block 703 to continue monitoring for update messages and interrupt messages.

At block 703, if the L2 cache 320A has received an interrupt message from the interrupt controller 220, the process 70 continues at block 715. The interrupt message includes an interrupt vector (containing information about the type of interrupt, specifies an ISR for handling the interrupt, etc.) and a copy of the task priority value read from the task priority register 421 at the time the interrupt message was generated. The interrupt message received at block 703 is the initial indication to the processing unit that an interrupt event has occurred.

At block 715, the comparison logic 414 determines whether the shadow copy 411 of the task priority value matches the task priority value sent in the interrupt message. If the copies match, then no race condition is detected. At block 717, the control logic 413 responds to receiving the interrupt message by checking the danger flag 412. If the danger flag is not asserted, this also indicates that no potential race condition is detected. Accordingly, the interrupt vector is obtained from the interrupt message, as provided at block 719, and is sent to the processor core 231A from the communication interface 415 of the L2 cache 320A, as provided at block 721. In response to receiving the interrupt vector, the processor core 231A services the interrupt indicated in the interrupt message by pausing execution of its current task and initiating execution of the ISR specified in the vector.

At block 715, if the shadow copy 411 of the task priority value does not match the copy of the task priority received with the interrupt message, the process 700 continues at block 723. The communication latency for writing the shadow copy 411 of the task priority to the L2 cache 320A is substantially shorter than the communication latency for transmitting messages (e.g., updated interrupt control values and interrupt messages) between the L2 cache 320A and the interrupt controller 220. Thus, a mismatch between the copies of the task priority value indicates a race condition, in which the interrupt message was generated before the updated task priority value was received at the interrupt controller 220.

If the copies of the task priority value match at block 715, a potential race condition can alternatively be detected at block 717 if the danger flag 412 is asserted. In this case, the danger flag 412 is deasserted at block 718. When a race condition is detected by either the shadow copy comparison at block 715 or the danger flag check at block 717, the process 700 sends a message requesting the interrupt vector to the interrupt controller 220, as provided at block 723. If the interrupt controller 220 responds by sending the interrupt vector for the received interrupt message, the L2 cache 320A sends the vector to the processor core 231A, as provided at block 721, and the processor core 231A starts the ISR to handle the interrupt. From block 721, the process 700 returns to block 701.

In some cases, the interrupt controller 220 does not return the requested interrupt vector. For example, when a new task priority is higher than the priority of the interrupt or the new interrupt enable value disables the interrupt, the interrupt controller 220 instead returns an indication that the interrupt does not need to be serviced. In this case, the process 700 returns from block 725 to block 701. From block 701, the process 700 continues monitoring for updates to the interrupt control values and interrupt messages. Blocks 701-713 are repeated for each update of an interrupt control value, and blocks 703 and 715-725 are repeated for each interrupt message that is received. Thus, race conditions affecting some interrupt messages are detected by the shadow copy comparison, while potential race conditions affecting other interrupt messages are detected by observing an asserted danger flag.

Figure 8:
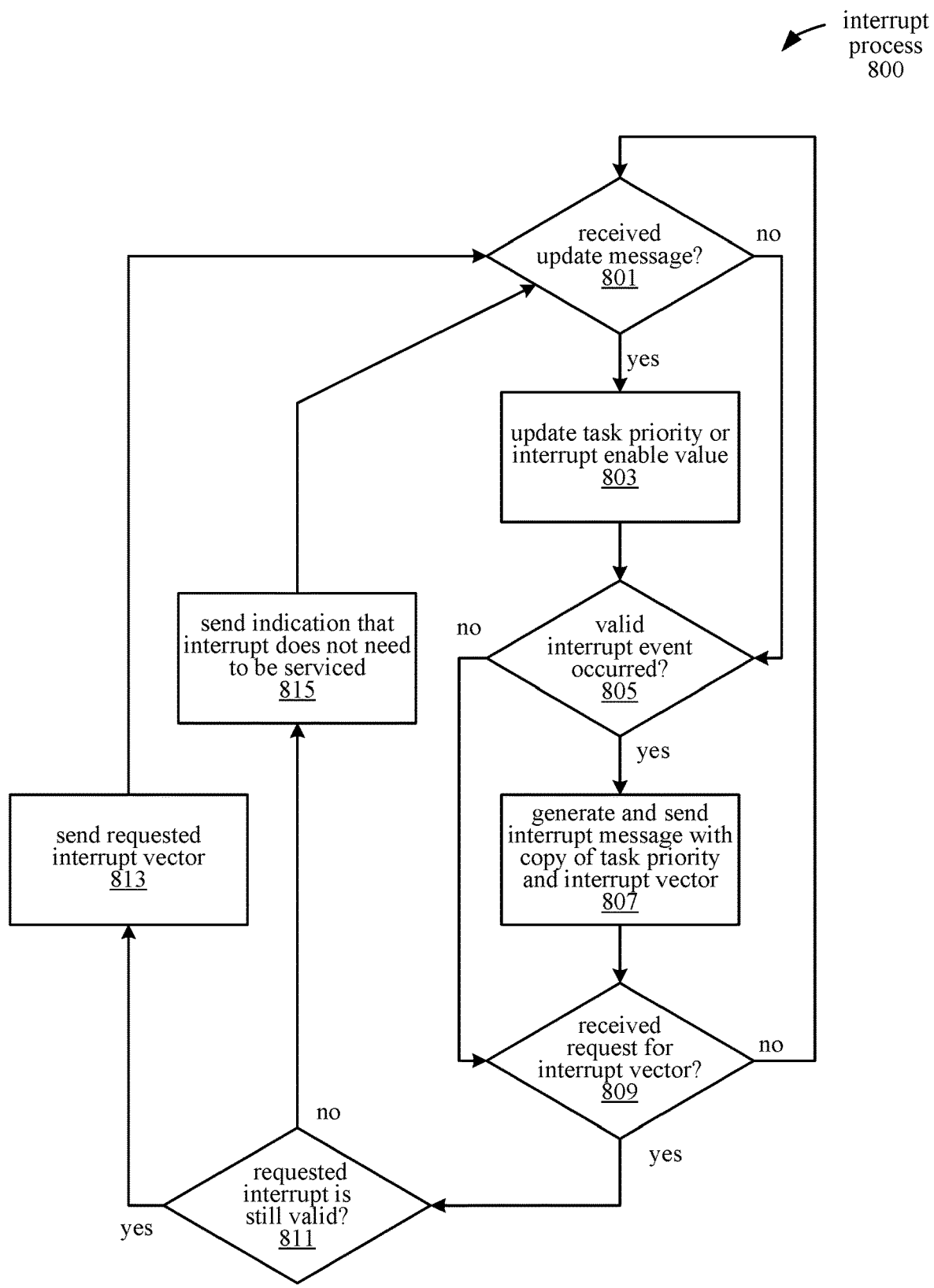

FIG. 8 is a flow diagram illustrating a process 800 of generating interrupt messages and updating interrupt control values, according to an embodiment. The process 800 is performed by the interrupt controller 220. At block 801, if the interrupt controller 220 has received, from the processor core 231A or another core, an update message requesting a change to an interrupt control value (e.g., a task priority, interrupt enable value, etc.), then the update is effected at block 803. At block 803, the interrupt controller 220 updates the task priority and/or interrupt enable value by writing the new values in the task priority register 421 and/or the interrupt enable mask register 422, respectively, and the process 800 continues at block 805. At block 801, if an update message is not received that requests a change to an interrupt control value, the process 800 continues from block 801 to block 805 without writing any values to the registers 421 and 422.

At block 805, if a valid interrupt event occurs in one of the devices 225A-N that is enabled (according to the interrupt enabled value in register 422) and has a higher priority than the task priority value in register 421, then the interrupt controller 220 generates and sends an interrupt message as provided at block 807. The interrupt message includes the task priority value, which is read from the task priority register 421 at the time the interrupt message is generated. The interrupt message also includes an interrupt vector that includes information about the type of interrupt and the ISR to be executed for servicing the interrupt. The interrupt controller transmits the interrupt message to the L2 cache 320A via the interconnect fabric 125, and the process 800 continues at block 809. If a valid interrupt event has not occurred at block 805, the process 800 continues at block 809 without generating an interrupt message.

If a race condition is not detected based on the interrupt message when it is received at the L2 cache 320A, the L2 cache 320A sends the interrupt vector included in the interrupt message to the processor core 231A without sending a request for the interrupt vector from the interrupt controller 220. At block 809, if a request for the interrupt vector is not received, the process 800 returns to block 801 to continue checking for update messages, interrupt events, and interrupt vector requests.

If a race condition is detected based on the interrupt message, then the L2 cache 320A sends a message requesting the interrupt vector from the interrupt controller 220. At block 809, if the interrupt controller 220 receives a request for the interrupt vector, the process 800 continues at block 811. At block 811, if the requested interrupt is still valid (i.e., enabled by the interrupt enable value and having a higher priority than the task priority value), then the interrupt controller 220 sends the requested interrupt vector to the L2 cache 320A via the interconnect fabric 125, as provided at block 813. At block 811, if the requested interrupt is no longer valid (i.e., was disabled by a new interrupt enable value, or was superseded by a new higher task priority value), the interrupt controller 220 sends an indication that the interrupt does not need to be serviced, as provided at block 815. From block 813 or 815, the process 800 returns to block 801. Process 800 thus repeats to continue processing updates to the interrupt control values, interrupt events, and interrupt vector requests according to blocks 801-815.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A method of operating a processing unit, comprising:
storing a first copy of a first interrupt control value in a cache device of the processing unit with a first latency;
receiving from an interrupt controller a first interrupt message transmitted via an interconnect fabric with a second latency greater than the first latency, wherein the first interrupt message includes a second copy of the first interrupt control value; and
if the first copy matches the second copy, servicing an interrupt specified in the first interrupt message.

2. The method of claim 1, wherein:
the first interrupt control value comprises a task priority value; and
the method further comprises changing the task priority value by transmitting an update of the task priority value via the interconnect fabric to the interrupt controller, wherein the storing of the first copy in the cache device is performed prior to the receiving of the update at the interrupt controller.

3. The method of claim 1, wherein:
the storing of the first copy of the first interrupt control value in the cache device is performed in response to detecting an update of the first interrupt control value transmitted to the interrupt controller.

4. The method of claim 1, further comprising:
if the first copy differs from the second copy, requesting from the interrupt controller an interrupt vector corresponding to the interrupt message.

5. The method of claim 1, further comprising:
in the cache device, asserting a danger flag in response to detecting an update of a second interrupt control value transmitted to the interrupt controller.

6. The method of claim 5, wherein:
the update of the second interrupt control value comprises a write access directed to an interrupt enable register in the interrupt controller;
the second interrupt control value comprises an interrupt enable value stored in the interrupt enable register; and
the method further comprises transmitting the interrupt enable value to the interrupt controller via the interconnect fabric.

7. The method of claim 5, further comprising:
in response to receiving a second interrupt message when the danger flag is asserted,
requesting from the interrupt controller an interrupt vector associated with the second interrupt message, and
deasserting the danger flag.

8. The method of claim 1, wherein:
the first interrupt message is received at the processing unit as an initial indication that the interrupt has occurred; and
servicing the interrupt comprises:
interrupting a current task being executed in the processing unit, and
initiating execution in the processing unit of an interrupt service routine identified in the first interrupt message.

9. The method of claim 1, wherein:
the first latency includes a first communication latency for writing the first copy of the first interrupt control value to the cache device, and the second latency includes a second communication latency for transmitting the first interrupt message from the interrupt controller to the processing unit.

10. A computing device, comprising:
control logic configured to write a first copy of a first interrupt control value in a cache device with a first latency,
a communication interface configured to receive a second copy of the first interrupt control value from an interrupt message transmitted via an interconnect fabric with a second latency greater than the first latency; and comparison logic coupled with the control logic and the communication interface, wherein the comparison logic is configured to initiate an interrupt service routine specified in the first interrupt message if the first copy matches the second copy.

11. The computing device of claim 10, wherein:

the first interrupt control value comprises a task priority value;

the computing device further comprises a processor configured to change the task priority value by transmitting an update of the task priority value via the interconnect fabric to an interrupt controller to cause the interrupt controller to change the task priority value in a task priority register of the interrupt controller; and the control logic is further configured to store the first copy of the task priority value in the cache device in response to the transmitting of the update of the task priority value to the interrupt controller, wherein the first copy is stored in the cache device prior to receiving of the update by the interrupt controller.

12. The computing device of claim 10, wherein:

the comparison logic is further configured to, if the first copy differs from the second copy, initiate a request for an interrupt vector from the interrupt controller.

13. The computing device of claim 10, further comprising:

a processor configured to update an interrupt enable value by transmitting the interrupt enable value for writing in an interrupt enable register in the interrupt controller, wherein the control logic is further configured to assert a danger flag in response to the update.

14. The computing device of claim 13, wherein:

the processor is further configured to, in response to receiving a second interrupt message when the danger flag is asserted, request from the interrupt controller an interrupt vector associated with the second interrupt message, and the control logic is further configured to, in response to the receiving of the second interrupt message when the danger flag is asserted, deassert the danger flag.

15. The computing device of claim 10, further comprising a processor coupled with the communication interface and configured to service the interrupt by:

interrupting execution of a current task being executed in the processor, and executing an interrupt service routine identified in the first interrupt message.

16. A computing system, comprising:

an interconnect fabric;

an interrupt controller configured to transmit a first interrupt message with a first latency via the interconnect fabric based on a first interrupt control value;

a processing unit configured to:

store a first copy of a first interrupt control value in a cache device with a second latency less than the first latency;

receive the first interrupt message from the interrupt controller, wherein the first interrupt message includes a second copy of the first interrupt control value; and if the first copy matches the second copy, servicing an interrupt specified in the first interrupt message.

17. The computing system of claim 16, wherein:

the first interrupt control value comprises a task priority value; and the processing unit is configured to:

change the task priority value by transmitting an update of the task priority value via the interconnect fabric to the interrupt controller to cause the interrupt controller to change the task priority value in a task priority register of the interrupt controller, and store the first copy of the task priority value in the cache device in response to the update, wherein the first copy is stored in the cache device prior to receiving of the update by the interrupt controller.

18. The computing system of claim 16, wherein:

the processing unit is further configured to, if the first copy differs from the second copy, request from the interrupt controller an interrupt vector corresponding to the interrupt message; and the interrupt controller is configured to, in response to the request, transmit the interrupt vector to the processing unit via the interconnect fabric.

19. The computing system of claim 16, wherein the processing unit is further configured to:

update a second interrupt control value by:

transmitting the second interrupt control value to the interrupt controller via the interconnect fabric, and asserting a danger flag; and in response to receiving a second interrupt message when the danger flag is asserted:

request from the interrupt controller an interrupt vector associated with the second interrupt message, and deassert the danger flag.

20. The computing system of claim 16, further comprising:

one or more peripheral devices coupled with the interrupt controller, wherein the interrupt controller is configured to transmit the interrupt message in response to an interrupt event occurring in the one or more peripheral devices.

* * * * *